United States Patent [19]
Seki et al.

[11] Patent Number: 4,961,041
[45] Date of Patent: Oct. 2, 1990

[54] METHOD OF CREATING NUMERICAL CONTROL DATA FOR ROUGH MACHINING

[75] Inventors: Masaki Seki, Tokyo; Koji Samukawa; Hidenori Meguro, both of Yamanashi, all of Japan

[73] Assignee: Fanuc Ltd., Minamitsuru, Japan

[21] Appl. No.: 314,054

[22] PCT Filed: Jun. 29, 1988

[86] PCT No.: PCT/JP88/00651
§ 371 Date: Feb. 9, 1989
§ 102(e) Date: Feb. 9, 1989

[87] PCT Pub. No.: WO89/00303
PCT Pub. Date: Jan. 12, 1989

[30] Foreign Application Priority Data
Jun. 30, 1987 [JP] Japan .................. 62-163534

[51] Int. Cl.$^5$ .................................................. G05B 19/33
[52] U.S. Cl. ........................... 318/578; 318/572; 318/603; 318/631; 364/474.03
[58] Field of Search ............ 318/578, 572, 603, 621; 364/474.03; 409/80

[56] References Cited

U.S. PATENT DOCUMENTS

| | | | |
|---|---|---|---|
| 4,534,685 | 8/1985 | Komiya et al. | 409/80 |
| 4,558,977 | 12/1985 | Inoue et al. | 409/80 |
| 4,719,578 | 1/1988 | Okitomo et al. | 364/474 |
| 4,746,251 | 5/1988 | Yoshikawa et al. | 409/84 |
| 4,814,998 | 3/1980 | Aramaki | 364/474.03 |
| 4,851,986 | 7/1989 | Seki et al. | 364/191 |

*Primary Examiner*—William M. Shoop, Jr.
*Assistant Examiner*—Saul M. Bergmann
*Attorney, Agent, or Firm*—Staas & Halsey

[57] ABSTRACT

This invention relates to a method of creating NC data for rough machining, in which a cutting path (QLi) for rough machining is outputted using points on an i-th point sequence path (PLi) from among a plurality of point sequence paths repeatedly digitized at a predetermined interval in a predetermined direction. The next cutting path for rough machining is created and output using a projected point sequence path (PLk') which, among those projected point sequence paths spaced away from the i-th point sequence path by a distance greater than a tool radius (Tr), is that nearest an i-th projected point sequence path (PLi').

5 Claims, 4 Drawing Sheets

METHOD OF CREATING NUMERICAL CONTROL DATA FOR ROUGH MACHINING

TECHNICAL FIELD

This invention relates to a method of creating Numerical Control (NC) data for rough machining. More particularly, the invention relates to a method of creating NC data for rough machining in which a workpiece is roughed out by a tool of a predetermined radius using surface data (tool nose position data) digitized by tracing or the like.

BACKGROUND ART

There is a method of creating NC data for machining in accordance with the profile of a model using model surface data digitized while tracing is executed.

FIG. 4 is an explanatory view in which surface data of a model MDL are digitized by X-Z two-way surface tracing. This involves moving a stylus STL along the X axis at a predetermined tracing velocity, allowing the stylus to move up and down along the model MDL in the direction of the Z axis, and storing three-dimensional position data indicative of stylus position every predetermined time. When the boundary of a tracing region TRR is reached, a predetermined amount of pick-feed is performed in the direction of the Y axis, after which surface tracing is similarly executed in an opposite x-axis direction. During this surface tracing, the position of the stylus STL is monitored, the resulting position data are accepted and the surface of the model MDL is digitized. The surface data are subsequently employed to create NC data.

For cases in which a workpiece is subjected to roughing-out machining by a tool 21 of a predetermined diameter using a plurality of digitized point sequence path data a in the prior art, a method has already been put into practical use in which NC data for rough machining are created while skipping a number of point sequence paths at equal intervals. For example, letting L1 ~L7 represent a plurality of digitized point sequence paths, as shown in FIG. 5, L1, L4 and L7 are adopted as the cutting paths for rough machining, with two point sequence paths (L2, L3 or L5, L6) being skipped between each adopted path.

After rough machining tool 21 performs machining from right to left along, the point sequence path L1, a pick-feed is performed in the Y-axis direction and then machining is carried out from left to right along the next point sequence path L4. This means that the region actually machined by the rough machining tool 21 by movement along the latter L4 path is solely the portion (the shaded portion) indicated by A, with the remaining portion being a region already cut, namely a non-cutting region E overlapping the previously cut path.

Accordingly, if the number of skipped point sequence paths is designated improperly, the non-cutting region E will be larger than the actually cut region A. In other words, the overlap of the previously cut path consumes too much time and efficiency suffers.

An object of the present invention is to provide a method of creating NC data for rough machining in which, when a workpiece is subjected to roughing-out machining by a tool of a predetermined radius using a plurality of digitized point sequence path data, non-cutting regions are reduced so that highly efficient roughing-out machining can be performed.

DISCLOSURE OF THE INVENTION

In a method of creating NC data for rough machining according to the present invention, a first cutting path for rough machining is outputted using an i-th point sequence path PLi from among a plurality of point sequence paths repeatedly digitized at a predetermined interval in a predetermined direction. A second cutting path for rough machining is then generated and as a point sequence path which among the point sequence paths spaced away from the i-th point sequence path PLi by a distance greater than the tool radius, is the point sequence path nearest the i-th point sequence path PLi (first cutting path).

BEST MODE FOR CARRYING OUT THE INVENTION

Figure 1A:
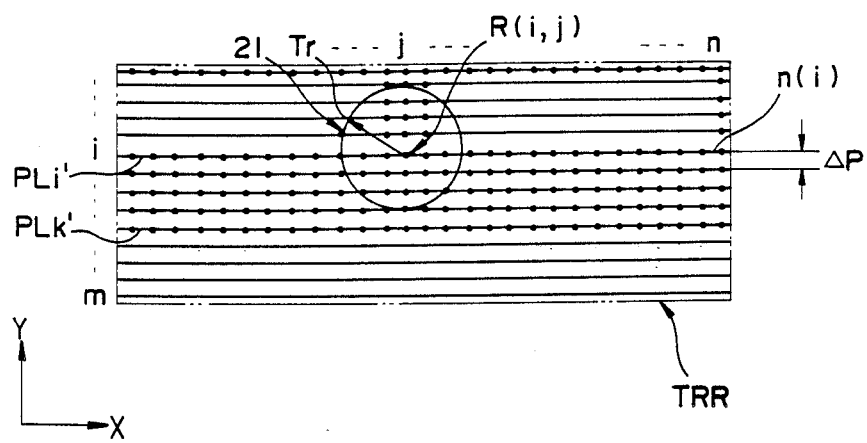
FIGS. 1 (a) and 1 (b) views are for describing the general features of the method of the present invention.
Figure 1B:
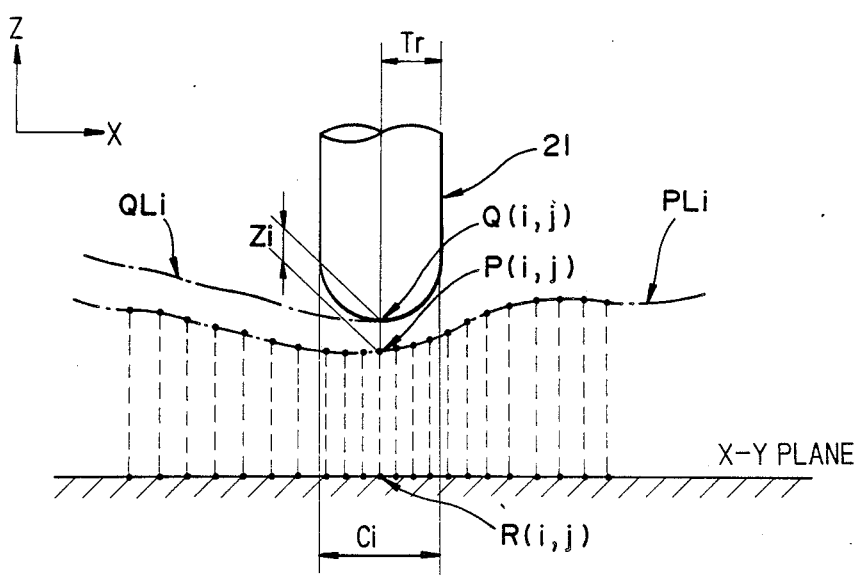

FIGS. 1 (a) and 1 (b) are views for describing the general features of the method of the present invention, in which FIG. 1 (a) is a view in which point sequences digitized by X-Z surface tracing are projected onto an X-Y plane, and FIG. 1 (b) is a sectional view taken along an i-th point sequence path PLi.

Numeral 21 denotes a tool for rough machining, Tr the radius of the roughing tool 21, PLi an i-th point sequence path, PLi' a point sequence path obtained by projecting this point sequence path onto the XY plane, QLi a cutting path for rough machining corresponding to the point sequence path PLi, P(i,j) a j-th digitized point on the point sequence path PLi, R(i,j) a point obtained by projecting the digitized point P(i,j) onto the X-Y plane, and Q(i,j) a point on the rough machining cutting path QLi corresponding to the digitized point P(i,j).

When the cutting path QLi for rough machining is outputted using the i-th point sequence path PLi, the next cutting path for rough machining is created and outputted using a projected point sequence path PLk' which, among those projected point sequence paths spaced away from a projected point sequence path PLi' in the XY plane by a distance greater than the tool radius Tr, is that nearest the projected point sequence path PLi'.

Figure 2:
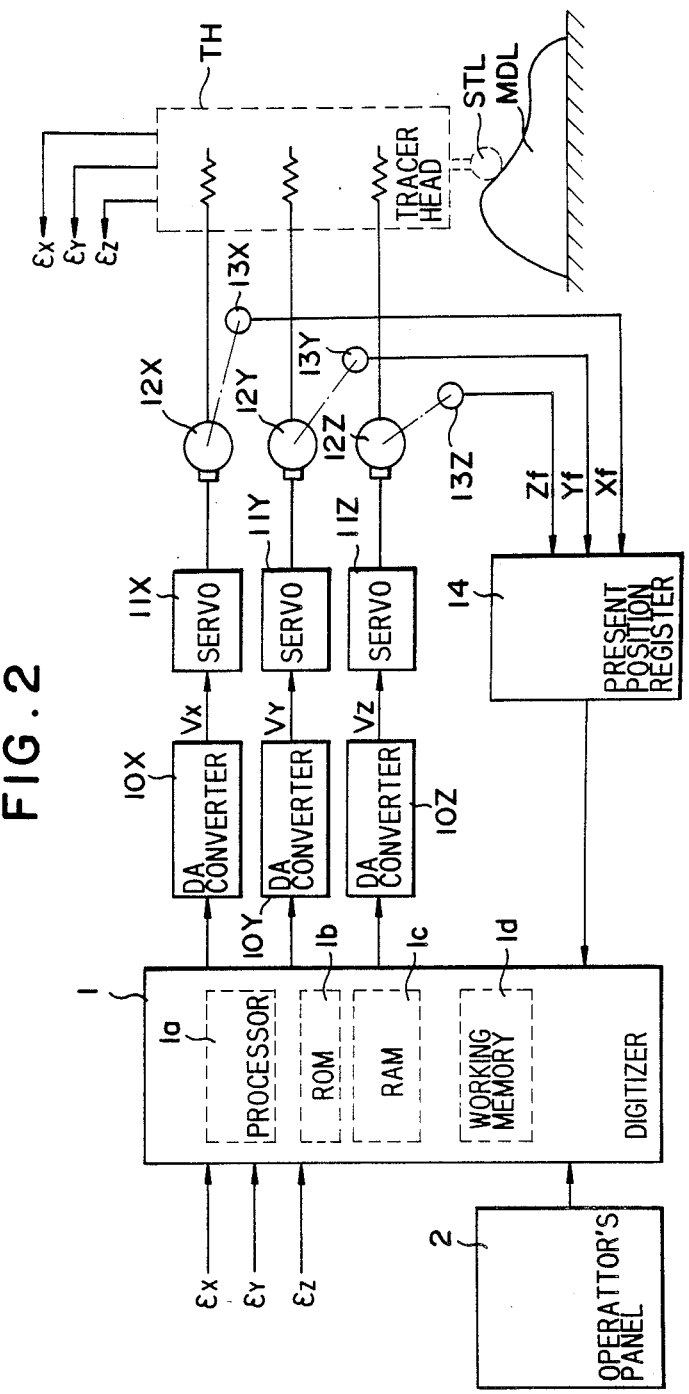
FIG. 2 is a block diagram of an apparatus (a digitizer) for practicing the method of the invention.

FIG. 2 is a block diagram showing an apparatus (a digitizer) for practicing the method of the present invention.

In FIG. 2, numeral 1 denotes a digitizer equipped with an NC data creating function in addition to a digitizing function for accepting the present position of a tracer head while tracer control is being effected The digitizer 1 has a processor 1a, a ROM 1b for storing a control program, a RAM 1c for storing digitizing data, and a working memory 1d.

Numeral 2 denotes an operator's panel having functions for inputting various operation signals and setting tracing conditions, the tracing region TRR (see FIG. 1), the tracing method, a feedback amount Δp and the tool radius Tr, etc.

Numerals 10X, 10Y, 10Z denote DA converters for converting velocity data (digital values) along respective axes commanded by the digitizer 1 into respective analog velocity signals $V_x$, $V_y$, $V_z$. Numerals 11X, 11Y, 11Z denote X-, Y- and Z-axis servo circuits, respectively, 12X, 12Y, 12Z denote X-, Y- and Z-axis servomotors, respectively numerals 13X, 13Y, 13Z represent pulse generators for generating single pulses $X_f$, $Y_f$, $Z_f$, respectively, each time the corresponding motors rotate through a predetermined angle. Numeral 14 denotes a present position register for reversibly counting the pulses $X_f$, $Y_f$, $Z_f$ in accordance with the direction of movement, to store the present positions along the respective axes. Further, TH represents a tracer head, STL a stylus, and MDL a model.

Figure 3:
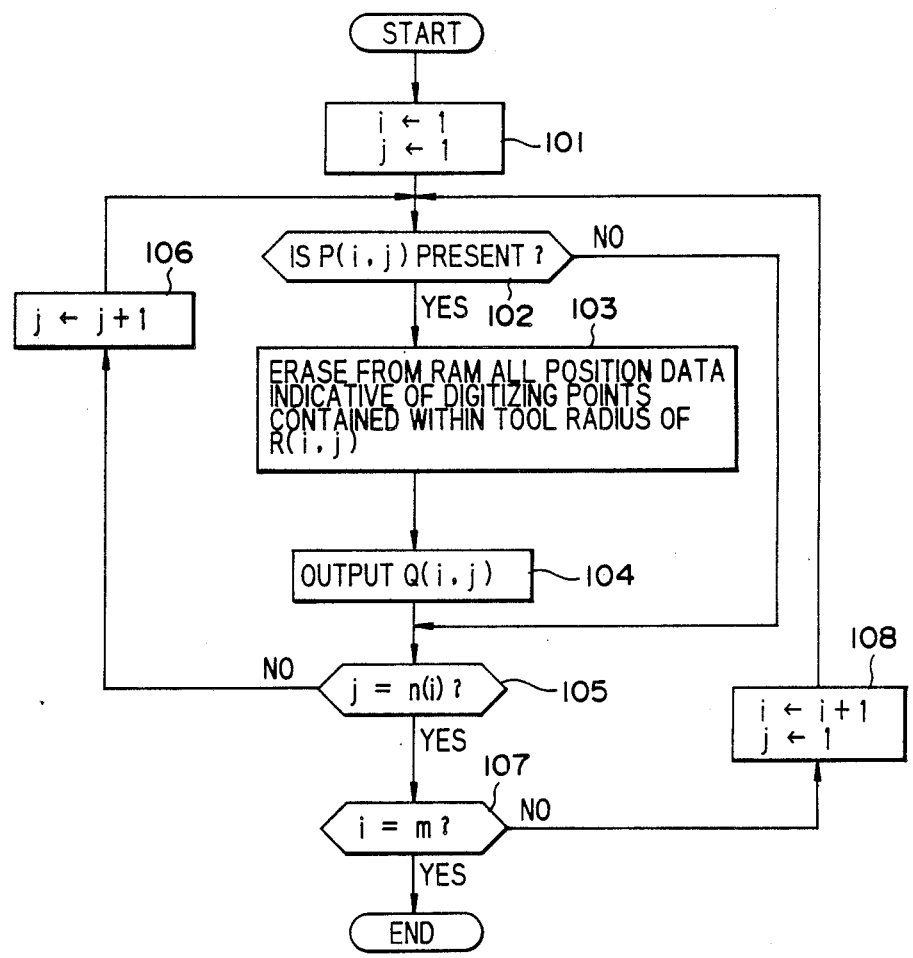
FIG. 3 is a flowchart illustrating processing for creating rough machining NC data according to the method of the invention.

FIG. 3 is a flowchart illustrating a process for creating rough machining NC data according to the method of the invention. Processing for creating rough machining NC data according to the invention will now be described in accordance with the flowchart of FIG. 3. It will be assumed here that the coordinates of a number of points [referred to as "digitized points" and indicated by the positions of the black circles in FIG. 1(b)] on the model surface MDL have already been accepted by a digitizing processor such as digitizer 1 based on X-Z surface tracing, and that these coordinates have been stored in the RAM 1c.

First, the processor 1a performs the operations 1 →i, 1 →j (step 101).

Next, it is determined whether position data indicative of the j-th digitized point P(i,j) on the i-th point sequence path PLi is present in the RAM 1c (step 102). In the absence of the data, the processing from step 105 onward is executed. If the data are present in memory, the processor obtains the point R(i,j), which is the projection of the digitized point P(i,j) onto the XY reference plane, and erases from the RAM 1call position data indicative of digitized points corresponding to projected points contained in a circle Ci whose center is the point R(i,j) and whose radius is the tool radius Tr (step 103).

Thereafter, the rough machining point Q(i,j) [e.g., a point, a predetermined value Zi above the digitized point P(i,j)] corresponding to the digitized point P(i,j) is outputted (step 104).

Next, the processor 1a determines whether j =n(i) holds, where n(i) is the number of digitizing points on the i-th point sequence path PLi (step 105). If j <n(i) is found to hold, then the operation j +1 →j is performed (step 106) and processing is repeated from step 102 onward.

If j =n(i) is found to hold, on the other hand, it is determined, by checking to see if i =m holds, whether processing has been terminated at the m-th point sequence path, which is boundary of the tracing region TRR (step 107). If processing has not been terminated at the m-th point sequence path defining the boundary of the tracing region TRR, the operations i +1 →i 1 →j are performed (step 108) and processing is repeated from step 102 onward.

Processing is ended if processing has been terminated at the m-th point sequence path defining the boundary of the tracing region TRR.

Thereafter, NC data for rough machining are created based on point sequence data of the rough machining point Q(i,j) outputted at step 104.

Thus, in accordance with the present invention, when creating NC data for roughing out a workpiece by a tool of a predetermined radius using a plurality of digitized point sequence pass data, point sequence paths used in creating the NC data for rough machining are selected automatically based on the tool radius. As a result, there are but a few non-cutting regions so that NC data can be created for highly efficient rough machining.

We claim:

1. A method of creating numerical control data for rough machining in which a workpiece is subjected to roughing-out by a tool of a predetermined radius, said method using point sequence paths selected from among a plurality of point sequence paths previously produced by digitizing a surface of the workpiece repeatedly at a predetermined interval in a predetermined direction, said method comprising the steps of:

(a) outputting a first cutting path for rough machining on the surface of the workpiece along an i-th point sequence path PLi;

(b) projecting each point sequence path onto a plane to produce projected point sequence paths;

(c) obtaining an i-th projected point sequence path PLi' representing said i-th point sequence path PLi projected onto the plane;

(d) obtaining in the plane a k-th projected point sequence path PLk' which among the projected point sequence paths spaced away from said i-th projected point sequence path PLi' by a distance greater than said predetermined radius of the tool is nearest said i-th projected point sequence path PLi'; and (e) generating and outputting a second cutting path on the surface of the workpiece for rough machining by selecting a k-th point sequence path among the point sequence paths, corresponding to said projected point sequence path PLk'.

2. A method of creating numerical control data for rough machining according to claim 1, characterized by adopting a point Q(i,j), which is located above a predetermined point P(i,j), on said point sequence path PLi by a distance of a predetermined value, as a point on the cutting path for rough machining.

3. A method of creating numerical control data for rough machining according to claim 1, characterized by:

projecting each point sequence path onto a predetermined plane;

obtaining a circle whose radius is the tool radius and whose center is a projected point R(i,j) obtained by projecting a point P(i,j) on said point sequence path PLi onto the predetermined plane;

eliminating all projected points contained within said circle as points not related to cutting paths for rough machining; and outputting a cutting path for rough machining using points on a cutting path that correspond to the remaining projected points.

4. A method of machining a workpiece using a tool of a predetermined radius, said method comprising the steps of:

(a) machining along a first cutting path, said first cutting path being a first point sequence path of a plurality of point sequence paths representing the workpiece;
(b) selecting a second cutting path from among the plurality of point sequence paths representing the workpiece, said second cutting path being selected from among the point sequence paths as (i) closest to said first cutting path and (ii) further than the predetermined radius from said first cutting path; and
(c) machining along the second cutting path.

5. A method of machining a workpiece using a rotary tool having a radius defining a circular cut region, the workpiece being mapped according to a plurality of parallel lines, each line consisting of a plurality of points, said method comprising the steps of:
(a) identifying mapping information for a particular point on a particular line;
(b) checking if the mapping information indicates machining has not occurred for the particular point on the particular line;
(c) recording mapping information that indicates machining has occurred for all points on all lines within the radius of the rotary tool centered at the particular point on the particular line if the checking indicates machining has not occurred for the particular point on the particular line;
(d) generating numerical control commands to move the rotary tool to be centered at the particular point on the particular line if the checking indicates machining has not occurred for the particular point on the particular line;
(e) repeating steps (a) through (d) for all of the plurality of points on the particular line; and
(f) repeating steps (a) through (e) for all of the plurality of lines.

* * * * *

UNITED STATES PATENT AND TRADEMARK OFFICE
CERTIFICATE OF CORRECTION

PATENT NO. : 4,961,041

DATED : October 2, 1990

INVENTOR(S) : Seki et al.

Figure 4:
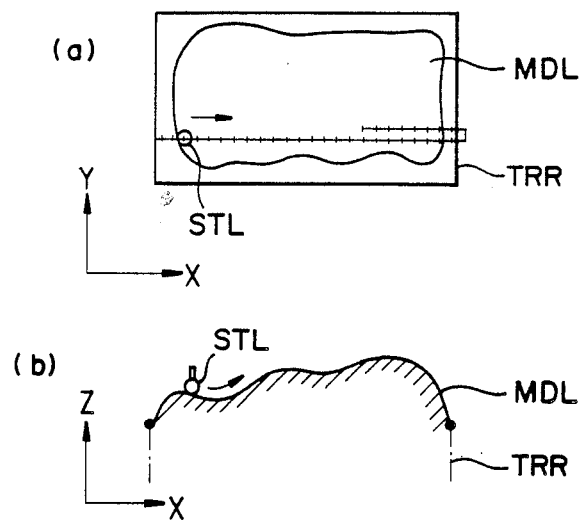
FIGS. 4 and 5 are explanatory views of an example of the prior art.
Figure 5:
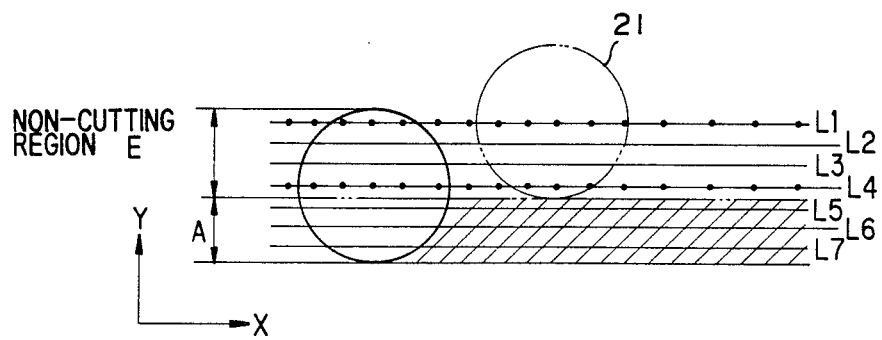

It is certified that error appears in the above-identified patent and that said Letters Patent is hereby corrected as shown below:

FIG. 2, "OPERATTOR'S" should be --OPERATOR'S--;
FIG. 3, "DIGITIZING" should be --DIGITIZED--.
FIG. 4 should be labeled --PRIOR ART--.
FIG. 5 should be labeled --PRIOR ART--.
Col. 1,    line 37, "data a in the prior art," should be --data, in the prior art--;

line 47, "along," should be --along--.

Col. 2,    lines 58 and 49 should be a continuous paragraph.

Col. 3,    line 9, "respectively, numerals" should be --respectively. Numerals--.

Signed and Sealed this

Twenty-first Day of April, 1992

Attest:

HARRY F. MANBECK, JR.

Attesting Officer     Commissioner of Patents and Trademarks